US011959392B2

(12) United States Patent
Ishida et al.

(10) Patent No.: US 11,959,392 B2
(45) Date of Patent: Apr. 16, 2024

(54) ROTOR BLADE

(71) Applicant: MITSUBISHI HEAVY INDUSTRIES, LTD., Tokyo (JP)

(72) Inventors: Tomohiro Ishida, Tokyo (JP); Toshifumi Kanno, Tokyo (JP); Hikaru Kurosaki, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 206 days.

(21) Appl. No.: 17/474,788

(22) Filed: Sep. 14, 2021

(65) Prior Publication Data

US 2022/0106882 A1 Apr. 7, 2022

(30) Foreign Application Priority Data

Oct. 6, 2020 (JP) ................................ 2020-168965

(51) Int. Cl.
*F01D 5/14* (2006.01)

(52) U.S. Cl.
CPC .......... *F01D 5/141* (2013.01); *F05D 2220/32* (2013.01); *F05D 2240/30* (2013.01)

(58) Field of Classification Search
CPC .................................. F01D 5/141; F01D 5/20
See application file for complete search history.

(56) References Cited

U.S. PATENT DOCUMENTS

| | | | | |
|---|---|---|---|---|
| 7,695,248 | B2 * | 4/2010 | Mons | B22F 12/53 219/121.64 |
| 10,830,057 | B2 * | 11/2020 | Beyer | F01D 5/20 |
| 2008/0038116 | A1 | 2/2008 | Zemitis et al. | |
| 2009/0180896 | A1 | 7/2009 | Brittingham | |
| 2018/0347375 | A1 * | 12/2018 | Beyer | F01D 5/187 |

FOREIGN PATENT DOCUMENTS

| | | |
|---|---|---|
| JP | 2008-38910 | 2/2008 |
| JP | 5603552 | 10/2014 |
| JP | 5868609 | 2/2016 |

* cited by examiner

*Primary Examiner* — Justin D Seabe
*Assistant Examiner* — John S Hunter, Jr.
(74) *Attorney, Agent, or Firm* — Wenderoth, Lind & Ponack, L.L.P.

(57) ABSTRACT

A rotor blade is a rotor blade to be attached to a rotor shaft rotatable about an axis, and includes a blade body extending in a radial direction with respect to the axis and having a blade-shaped cross-section orthogonal to the radial direction; a fillet portion provided on a radial outer side of the blade body and having a hollow portion formed therein; a shroud provided on a radial outer side of the fillet portion and extending in a circumferential direction; and a seal fin projecting from the shroud to an outer circumferential side and extending in a direction intersecting the blade body when viewed from the radial direction. A wall thickness on a suction side of the fillet portion is greater than a wall thickness on a pressure side of the fillet portion on a leading edge side of the blade body as demarcated by an intersection portion between the blade body and the seal fin serving as a boundary.

10 Claims, 13 Drawing Sheets

ROTOR BLADE

CROSS-REFERENCE TO RELATED APPLICATIONS

This application claims the benefit of priority to Japanese Patent Application Number 2020-168965 filed on Oct. 6, 2020. The entire contents of the above-identified application are hereby incorporated by reference.

TECHNICAL FIELD

The present disclosure relates to a rotor blade.

RELATED ART

A turbine, which is a type of axial flow rotary machine, includes a rotor shaft, a plurality of rotor blades arranged on an outer circumferential surface of the rotor shaft, and a cylindrical casing that covers the rotor shaft and the rotor blades from the outer circumferential side. As a specific example of a rotor blade used in such a turbine, the technology described in JP 2008-038910 A is known. The rotor blade according to JP 2008-038910 A includes a blade root to be attached to a rotor shaft, a blade body that extends radially outward from the blade root, a shroud provided on an end of the blade body on the radial outer side, and a plate-shaped seal fin that projects further radially outward from the shroud.

The blade body has a blade-shaped cross section when viewed from the radial direction. The shroud has a plate shape that extends in a plane intersecting the blade body. The seal fin is provided to prevent leakage of fluid on the outer circumferential side of the shroud. In addition, in the rotor blade described in JP 2008-038910 A, a cavity for reducing thickness is formed in the shroud in order to reduce load generated due to the centrifugal force associated with the rotation of the rotor shaft.

SUMMARY

Incidentally, during operation of the turbine, a load is applied to the shroud by centrifugal force such that the shroud is lifted up radially outward with the blade body serving as a fulcrum. In particular, a large tensile load is generated on the suction side of the blade body on the leading edge side, as demarcated by the intersection portion between the seal fin and the blade body serving as a boundary. Conversely, a large tensile load is generated on the pressure side of the blade body on the trailing edge side. In this way, an asymmetrical load distribution is formed with the intersection portion between the seal fin and the blade body serving as a boundary. Therefore, an optimal strength structure based on the load distribution cannot be obtained by simply forming a cavity as in JP 2008-038910 A. In other words, there is still room for improvement in the technology of JP 2008-038910 A.

The present disclosure has been made to solve the above-described problem, and an object of the present disclosure is to provide a rotor blade capable of achieving both weight reduction and enhanced strength in a compatible manner.

In order to solve the above-described problems, a rotor blade according to the present disclosure is a rotor blade to be attached to a rotor shaft rotatable about an axis, the rotor blade including: a blade body extending in a radial direction with respect to the axis and having a blade-shaped cross-section orthogonal to the radial direction; a fillet portion provided on a radial outer side of the blade body and having a hollow portion formed therein; a shroud provided on a radial outer side of the fillet portion and extending in a circumferential direction; and a seal fin projecting from the shroud to an outer circumferential side and extending in a direction intersecting the blade body when viewed from the radial direction, in which a wall thickness on a suction side of the fillet portion is greater than a wall thickness on a pressure side of the fillet portion on a leading edge side of the blade body as demarcated by an intersection portion between the blade body and the seal fin serving as a boundary.

A rotor blade according to the present disclosure is a rotor blade to be attached to a rotor shaft rotatable about an axis, the rotor blade including: a blade body extending in a radial direction with respect to the axis and having a blade-shaped cross-section orthogonal to the radial direction; a fillet portion provided on a radial outer side of the blade body and having a hollow portion formed therein; a shroud provided on a radial outer side of the fillet portion and extending in a circumferential direction; and a seal fin projecting from the shroud to an outer circumferential side and extending in a direction intersecting the blade body when viewed from the radial direction, in which a height of the hollow portion in the radial direction is at a minimum at an intersection portion between the blade body and the seal fin, and increases toward a leading edge side and a trailing edge side.

A rotor blade according to the present disclosure is a rotor blade to be attached to a rotor shaft rotatable about an axis, the rotor blade including: a blade body extending in a radial direction with respect to the axis and having a blade-shaped cross-section orthogonal to the radial direction; a fillet portion provided on a radial outer side of the blade body and having a hollow portion formed therein; a shroud provided on a radial outer side of the fillet portion and extending in a circumferential direction; and a seal fin projecting from the shroud to an outer circumferential side and extending in a direction intersecting the blade body when viewed from the radial direction, in which a wall thickness on a suction side of the fillet portion is greater than a wall thickness on a pressure side of the fillet portion on a leading edge side of the blade body as demarcated by an intersection portion between the blade body and the seal fin serving as a boundary, and a height of the hollow portion in the radial direction is at a minimum at the intersection portion between the blade body and the seal fin, and increases toward the leading edge side and a trailing edge side.

According to the present disclosure, it is possible to provide a rotor blade capable of achieving both weight reduction and enhanced strength in a compatible manner.

BRIEF DESCRIPTION OF DRAWINGS

The disclosure will be described with reference to the accompanying drawings, wherein like numbers reference like elements.

DESCRIPTION OF EMBODIMENTS

Configuration of Gas Turbine

Hereinafter, a gas turbine 10, which is an axial flow rotary machine according to an embodiment of the present disclosure, and a rotor blade 50 will be described with reference to FIGS. 1 to 4. Note that the configuration described hereinafter can be suitably applied not only to the gas turbine 10 but also to other axial flow rotary machines including steam turbines and axial flow compressors.

Figure 1:
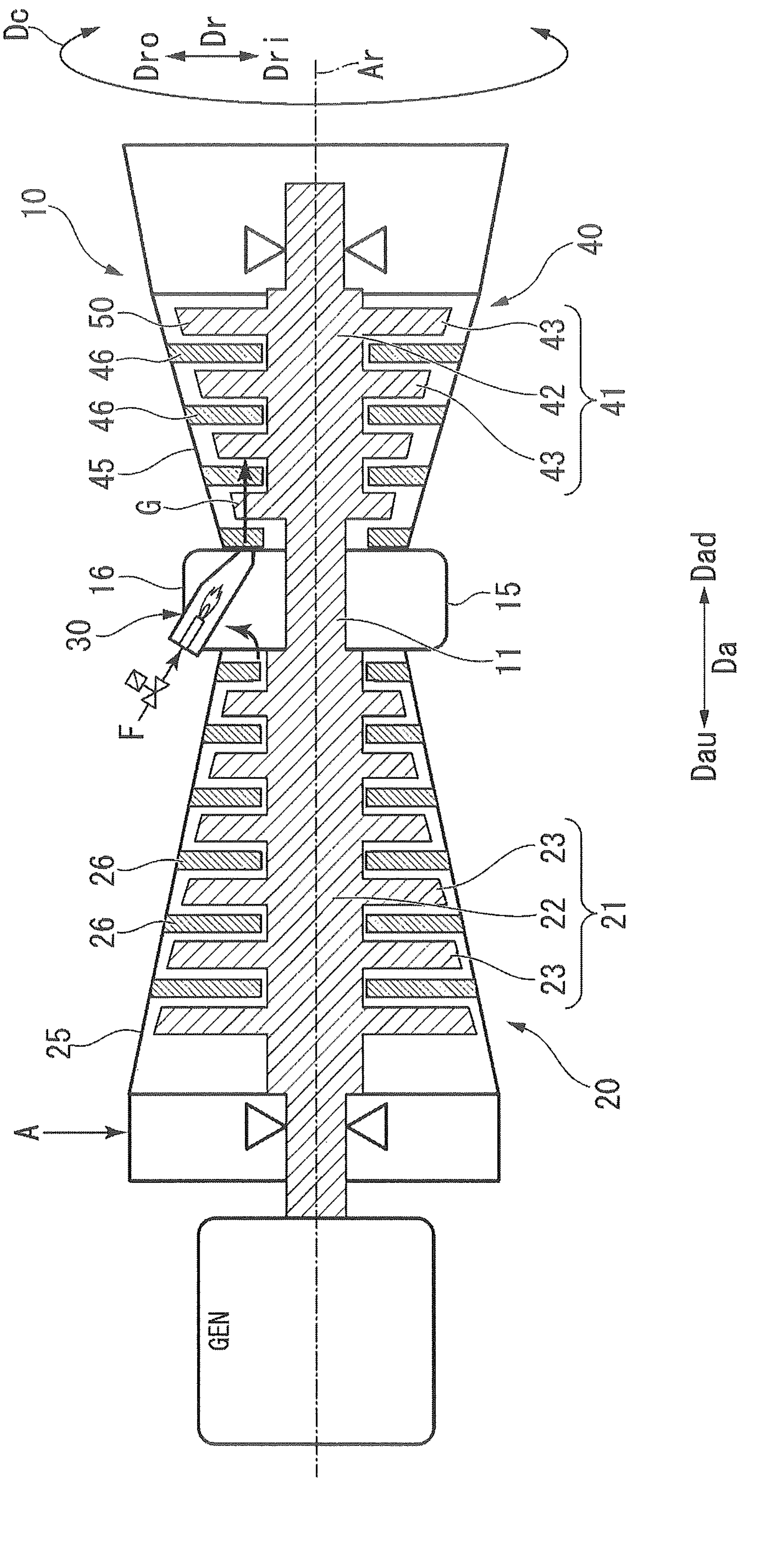
FIG. 1 is a schematic view illustrating the configuration of a gas turbine that is an axial flow rotary machine according to an embodiment of the present disclosure.

As illustrated in FIG. 1, the gas turbine 10 includes a compressor 20 that compresses air A, a combustor 30 that generates combustion gas G by combustion of fuel F in the air A compressed by the compressor 20, and a turbine 40 driven by the combustion gas G.

The compressor 20 includes a compressor rotor 21 that rotates about an axis Ar, a compressor casing 25 that covers the compressor rotor 21, and a plurality of stator vane rows 26. The turbine 40 includes a turbine rotor 41 that rotates about the axis Ar, a turbine casing 45 that covers the turbine rotor 41, and a plurality of stator vane rows 46. Note that in the following, it is assumed that a direction in which the axis Ar extends is an axial direction Da, a circumferential direction about this axis Ar is a circumferential direction Dc, and a direction orthogonal to the axis Ar is a radial direction Dr. In addition, it is assumed that one side in the axial direction Da is an axial upstream side Dau, and an opposite side to the one side is an axial downstream side Dad. In addition, it is assumed that, in the radial direction Dr, a side near the axis Ar is a radial inner side Dri, and a side opposite to the side near the axis Ar is a radial outer side Dro.

The compressor 20 is disposed on the axial upstream side Dau with respect to the turbine 40. The compressor rotor 21 and the turbine rotor 41 are located on the same axis Ar, and are connected to each other to form a gas turbine rotor 11. For example, a rotor of a generator GEN is connected to the gas turbine rotor 11. The gas turbine 10 further includes an intermediate casing 16 disposed between the compressor casing 25 and the turbine casing 45. The combustor 30 is attached to the intermediate casing 16. The compressor casing 25, the intermediate casing 16, and the turbine casing 45 are connected with each other to form a gas turbine casing 15.

The compressor rotor 21 includes a rotor shaft 22 extending in the axial direction Da about the axis Ar, and a plurality of rotor blade rows 23 attached to the rotor shaft 22. The plurality of rotor blade rows 23 are aligned in the axial direction Da. Each of the rotor blade rows 23 includes a plurality of rotor blades arranged in the circumferential direction Dc. One of the plurality of stator vane rows 26 is disposed on the axial downstream side Dad of each of the rotor blade rows 23. Each of the stator vane rows 26 is provided on the inner side of the compressor casing 25. Each of the stator vane rows 26 includes a plurality of stator vanes arranged in the circumferential direction Dc.

The turbine rotor 41 includes a rotor shaft 42 extending in the axial direction Da about the axis Ar and a plurality of rotor blade rows 43 attached to the rotor shaft 42. The plurality of rotor blade rows 43 are aligned in the axial direction Da. Each of the rotor blade rows 43 includes a plurality of rotor blades 50 arranged in the circumferential direction Dc. One of the plurality of stator vane rows 46 is disposed on the axial upstream side Dau of each of the plurality of rotor blade rows 43. Each of the stator vane rows 46 is provided on the inner side of the turbine casing 45. Each of the stator vane rows 46 includes a plurality of stator vanes arranged in the circumferential direction Dc.

The compressor 20 sucks air the A and compresses the air A. The air that has been compressed, that is, compressed air flows into the combustor 30 through the intermediate casing 16. The combustor 30 is supplied with fuel F from the outside. The combustor 30 combusts the fuel F in the compressed air to generate the combustion gas G. The combustion gas G flows into the turbine casing 45 to rotate the turbine rotor 41. The rotation of the turbine rotor 41 causes the power generator GEN to generate electric power.

Configuration of Rotor Blade

Figure 2:
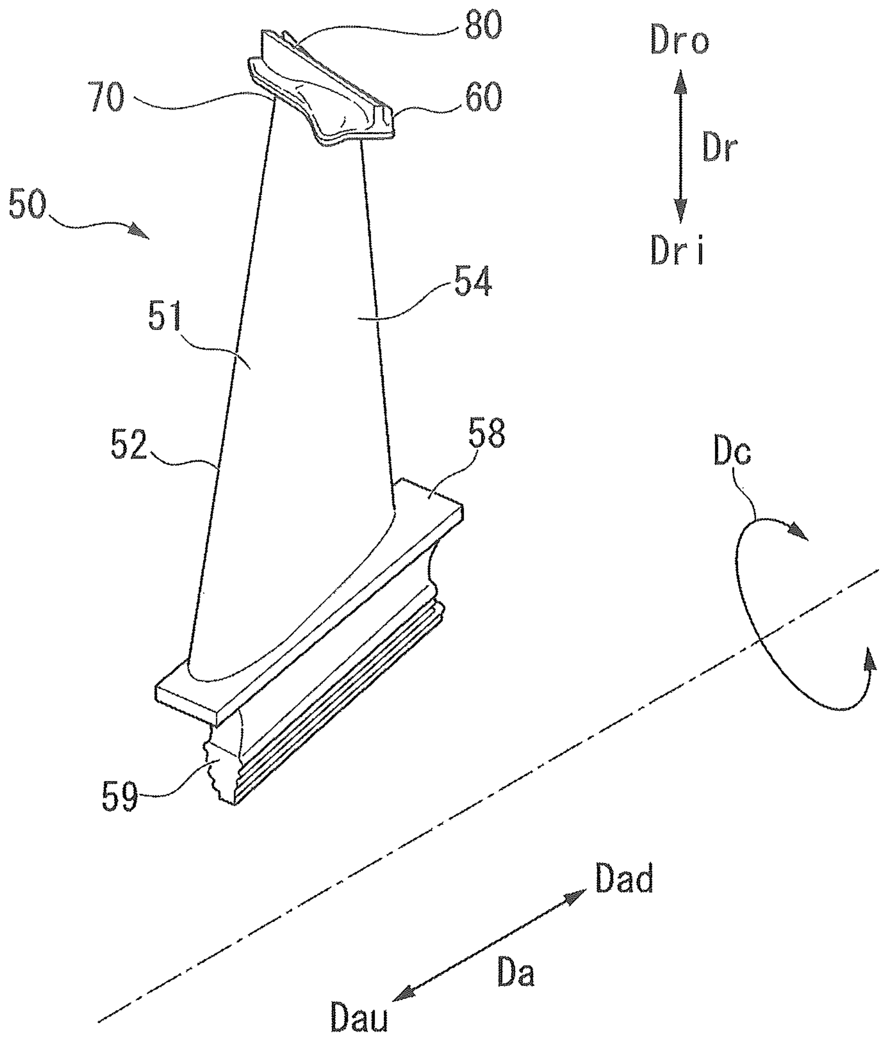
FIG. 2 is a perspective view illustrating the configuration of a rotor blade according to an embodiment of the present disclosure.

Next, the configuration of the rotor blade 50 will be described in detail with reference to FIGS. 2 to 6. As illustrated in FIG. 2, the rotor blade 50 includes a blade body 51 that is blade-shaped, a shroud 60, a fillet portion 70, a seal fin 80, a platform 58, and a blade root 59. The blade body 51 extends in the radial direction Dr. The cross section of the blade body 51 is blade-shaped. Note that this cross section is the cross section of the blade body 51 perpendicular to the radial direction Dr.

Figure 3:
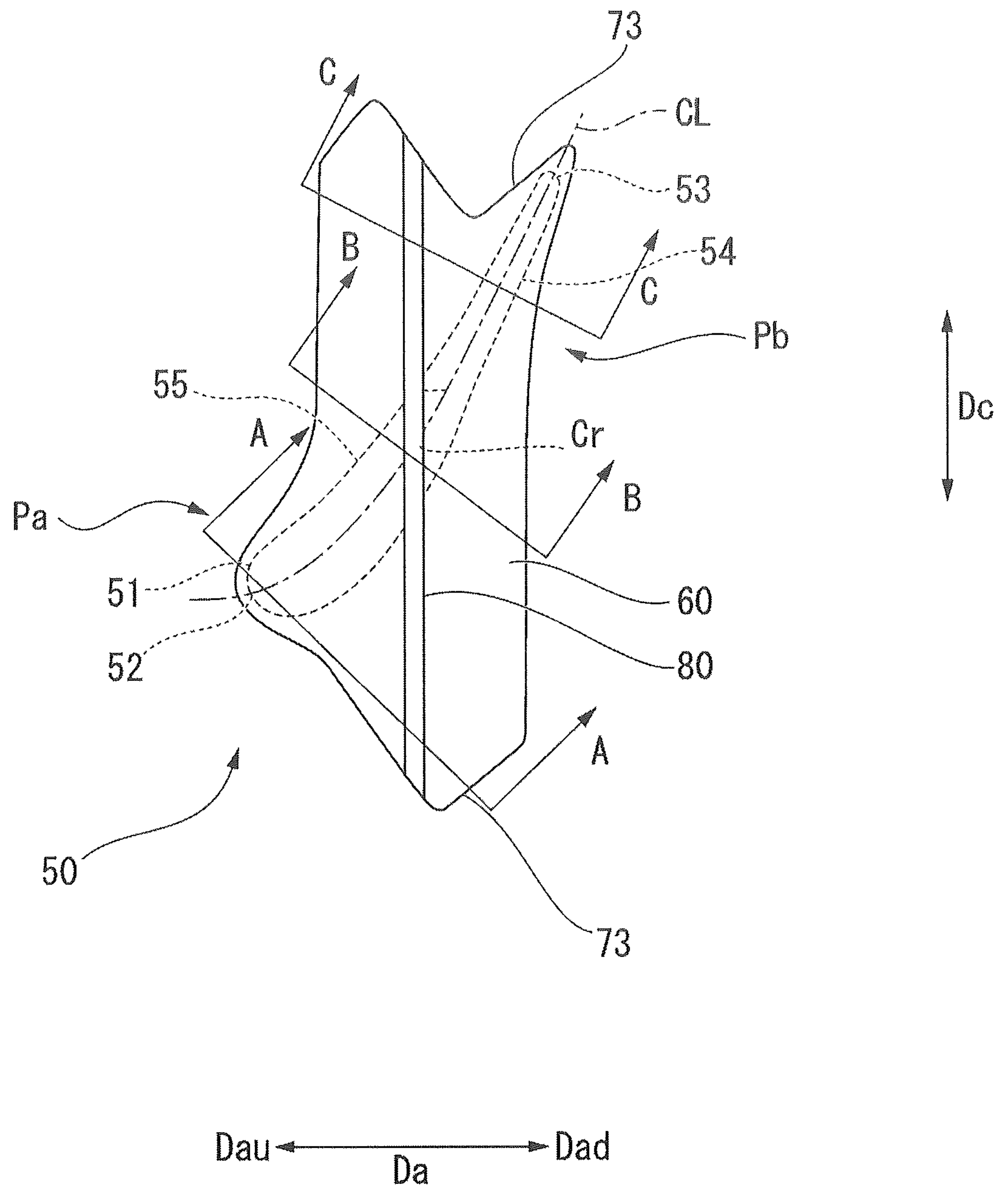
FIG. 3 is a view illustrating a shroud and a seal fin according to an embodiment of the present disclosure when viewed from the radial outer side.

As illustrated in FIG. 2 or FIG. 3, the blade body 51 includes a leading edge 52, a trailing edge 53, a suction side (suction-side surface) 54 that is a convex surface, and a pressure side (pressure-side surface) 55 that is a concave surface. The leading edge 52 and the trailing edge 53 represent connecting portions between the suction side 54 and the pressure side 55. All of the leading edge 52, the trailing edge 53, the suction side 54, and the pressure side 55 extend in a direction having a directional component of the radial direction Dr. The leading edge 52 is located on the axial upstream side Dau with respect to the trailing edge 53.

As illustrated in FIG. 2, the platform 58 is provided at an end of the blade body 51 on the radial inner side Dri. The platform 58 is shaped like a plate that extends in a plane having a directional component perpendicular to the radial direction Dr. The blade root 59 is a structure used for attaching the rotor blade 50 to the rotor shaft 42. The blade root 59 is provided on the radial inner side Dri of the platform 58.

The shroud 60 and the seal fin 80 are provided on an end of the blade body 51 on the radial outer side Dro. The shroud

60 is shaped like a plate that extends in a plane having a directional component perpendicular to the radial direction Dr. The fillet portion 70 represents a connection portion between the blade body 51 and the shroud 60. The fillet portion 70 is provided to avoid stress concentration between the blade body 51 and the shroud 60. The configuration of the fillet portion 70 will be described later.

As illustrated in FIG. 3, the shroud 60 has contact surfaces 73 on both sides in the circumferential direction Dc. The contact surface 73 of the shroud 60 of one rotor blade 50 and the contact surface 73 of the shroud 60 of another rotor blade 50 adjacent to the one rotor blade 50 in the circumferential direction Dc are opposed to and in contact with each other. Note that the contact surface 73 described herein is a surface of the shroud 60 at each circumferential end on the axial upstream side Dau, and a surface on the axial downstream side Dad does not contact the adjacent shroud 60.

The seal fin 80 is provided on an end surface (shroud outer circumferential surface 60A) of the shroud 60 on the radial outer side Dro. As illustrated in FIG. 2, the seal fin 80 projects radially outward in a plate shape from the shroud outer circumferential surface 60A. Here, as illustrated in FIG. 3, the portion where the blade body 51 and the seal fin 80 intersect when viewed from the radial direction is referred to as an intersection portion Cr. In other words, the direction in which a camber line CL of the blade body 51 extends and the direction in which the seal fin 80 extends differ from each other. As illustrated in FIG. 3, a portion of the rotor blade 50 on the leading edge 52 side relative to the intersection portion Cr is referred to as a leading edge-side portion Pa, while a portion of the rotor blade 50 on the trailing edge 53 side relative to the intersection portion Cr is referred to as a trailing edge-side portion Pb. Note that, strictly speaking, the intersection portion Cr refers to the portion where the camber line CL and the seal fin 80 intersect. Note that, for the position of the intersection portion Cr, it is also possible to set a position that is in the vicinity of and offset to the leading edge 52 side or the trailing edge 53 from a portion where the camber line CL and the seal fin 80 intersect.

Figure 4:
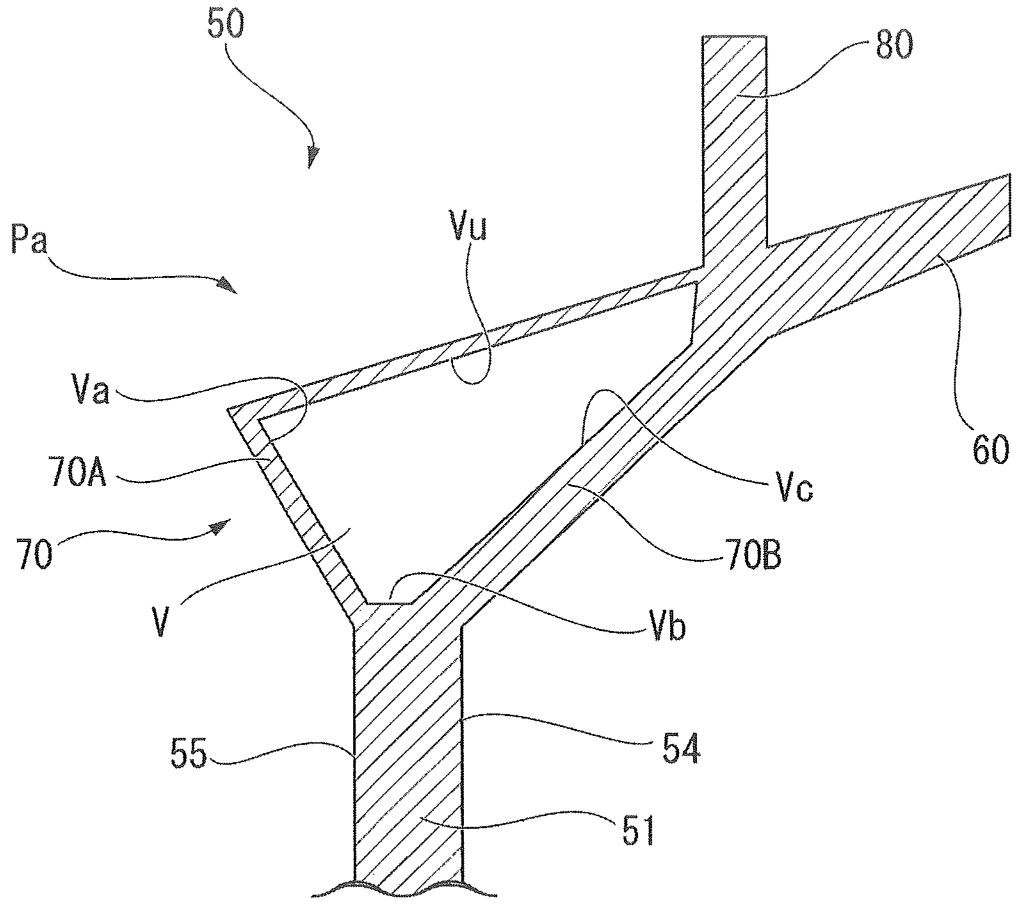
FIG. 4 is a cross-sectional view taken along the line A-A in FIG. 3.

Next, the internal structure of the blade body 51 will be described with reference to FIGS. 4 to 6. FIG. 4 is a cross-sectional view of the leading edge-side portion Pa of the rotor blade 50. As illustrated in the drawing, a space (a hollow portion V) is formed inside the fillet portion 70. The hollow portion V is surrounded by a pressure-side wall portion 70A facing the pressure side 55, a suction-side wall portion 70B facing the suction side 54, and the shroud 60. Note that in the present embodiment, ribs, partition members and other such members are not disposed within the hollow portion V. However, it is possible to provide these members within the hollow portion V depending on design and specifications.

The pressure-side wall portion 70A extends toward the pressure side 55 as it extends radially outward from the end of the blade body 51 on the radial outer side. Of both surfaces of the pressure-side wall portion 70A, a surface facing the hollow portion V side is referred to as a pressure-side internal wall surface Va. The suction-side wall portion 70B extends toward the suction side 54 as it extends radially outward from the end of the blade body 51 on the radial outer side. Of both surfaces of the suction-side wall portion 70B, a surface facing the hollow portion V side is referred to as a suction-side internal wall surface Vc. The inner surface of the shroud 60 (that is, the surface facing the hollow portion V side) is referred to as a top surface Vu. In addition, a surface opposed to the top surface Vu in the radial direction is referred to as a bottom surface Vb.

In the leading edge-side portion Pa, the suction-side wall portion 70B has a greater wall thickness compared to that of the pressure-side wall portion 70A. In other words, the wall thickness of the pressure-side wall portion 70A decreases and the wall thickness of the suction-side wall portion 70B increases from the intersection portion Cr toward the leading edge 52 side.

Figure 5:
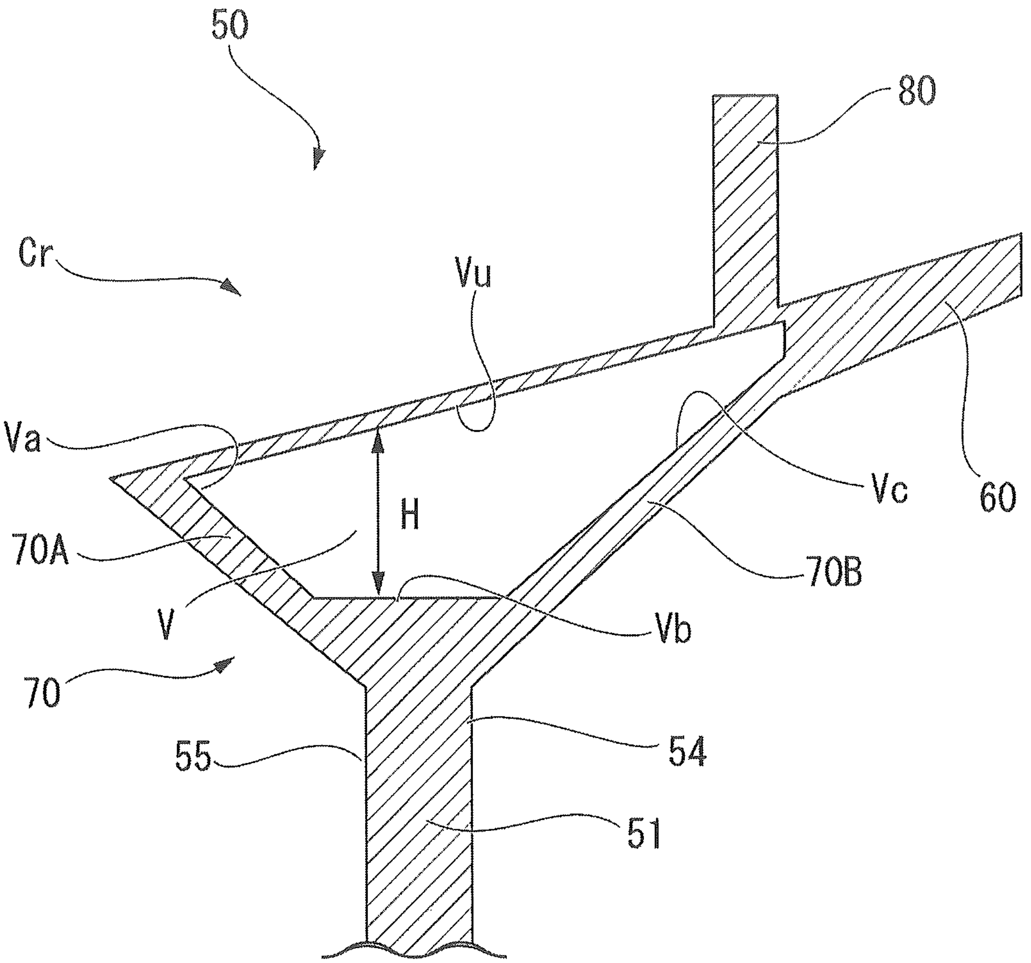
FIG. 5 is a cross-sectional view taken along the line B-B in FIG. 3.

FIG. 5 is a cross-sectional view of the intersection portion Cr of the rotor blade 50. As illustrated in the figure, in the intersection portion Cr, the wall thickness of the pressure-side wall portion 70A and the wall thickness of the suction-side wall portion 70B described above are identical to each other. Note that the term "identical" as used herein refers to being substantially identical, and a design tolerance and a manufacturing error are allowed. In other words, the difference in wall thickness between the pressure side and the suction side is the smallest at the intersection portion Cr compared to that at the leading edge-side portion Pa or the trailing edge-side portion Pb. In addition, the dimension of the hollow portion V in the radial direction (that is, the distance from the top surface Vu to the bottom surface Vb or the height H) is the smallest at the intersection portion Cr, and is greater than the height of the intersection portion Cr at at least a part of the leading edge-side portion Pa or the trailing edge-side portion Pb. Note that it is also possible to adopt a configuration in which the hollow portion V is formed on only one of the leading edge-side portion Pa and the trailing edge-side portion Pb.

Figure 6:
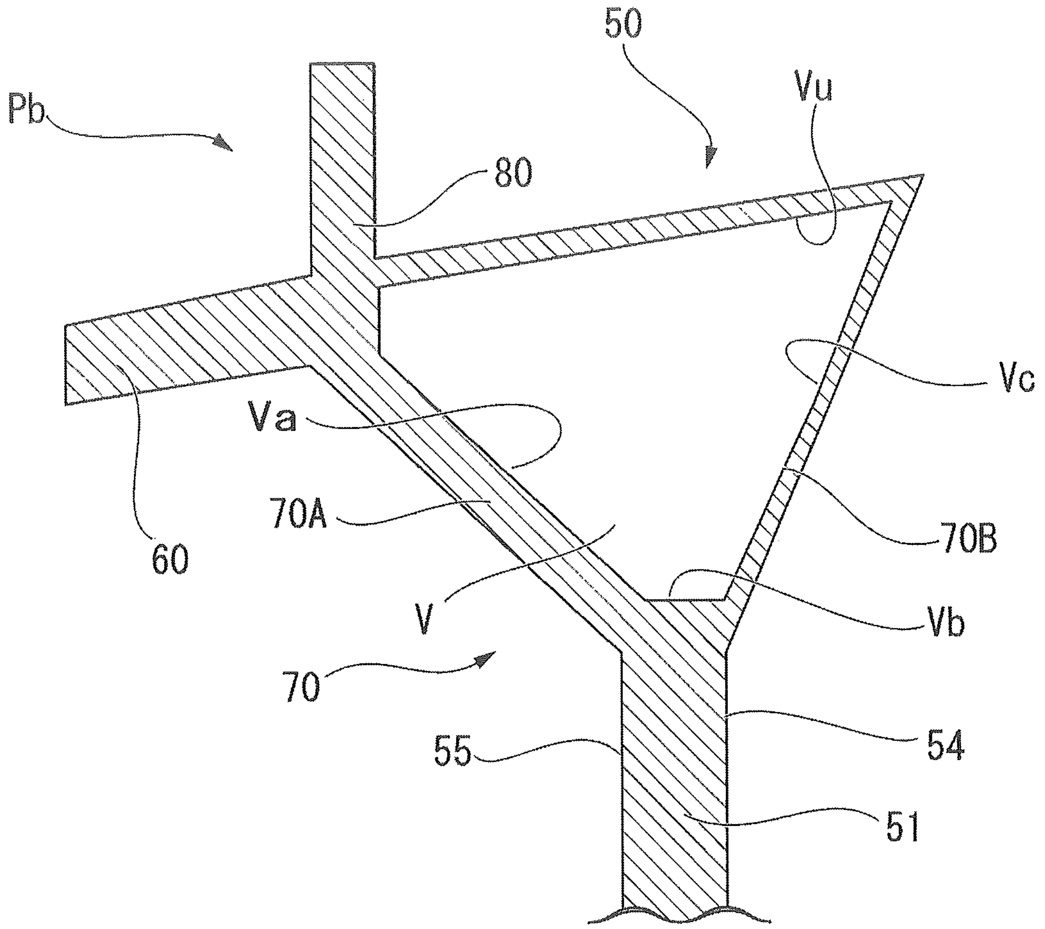
FIG. 6 is a cross-sectional view taken along the line C-C in FIG. 3.

FIG. 6 is a cross-sectional view of the trailing edge-side portion Pb. As illustrated in the figure, in the trailing edge-side portion Pb, the pressure-side wall portion 70A has a greater wall thickness compared to that of the suction-side wall portion 70B. In this way, the dimensional shape of the hollow portion V changes from the leading edge-side portion Pa through the intersection portion Cr to the trailing edge-side portion Pb.

Operational Effects

Incidentally, during operation of the turbine 40, a load is applied to the shroud 60 by centrifugal force such that the shroud 60 is lifted up radially outward with the blade body 51 serving as a fulcrum. In particular, a large tensile load is generated on the suction side 54 of the blade body 51 on the leading edge side as demarcated by the intersection portion Cr between the seal fin 80 and the blade body 51 serving as a boundary. Here, according to the above-described configuration, the wall thickness on the suction side 54 of the fillet portion 70 is greater than the wall thickness on the pressure side 55 of the fillet portion 70 on the leading edge side of the blade body 51 as demarcated by the intersection portion Cr between the blade body 51 and the seal fin 80 serving as a boundary. In other words, the wall thickness is greater on the suction side 54 on which the tensile load described above is applied than on the pressure side 55. As a result, the tensile load can be resisted sufficiently. Furthermore, the wall thickness on the pressure side 55 having a small tensile load can be kept relatively small to reduce the weight of the rotor blade 50.

Furthermore, according to the above-described configuration, the wall thickness on the pressure side 55 of the fillet portion 70 is greater than the wall thickness on the suction side 54 of the fillet portion 70 on the trailing edge side of the blade body 51 as demarcated by the intersection portion Cr between the blade body 51 and the seal fin 80 serving as a boundary. In other words, the wall thickness is greater on the pressure side 55 on which the tensile load described above is applied than on the suction side 54 side. As a result, the tensile load can be resisted sufficiently. Furthermore, the wall thickness on the suction side 54 having a small tensile load can be kept relatively small to reduce the weight of the rotor blade 50.

In the intersection portion Cr between the blade body 51 and the seal fin 80, a load is applied evenly on the pressure side 55 and the suction side 54. According to the above-described configuration, the wall thickness of the fillet portion 70 on the pressure side 55 and that on the suction side 54 are identical, so these loads can be stably resisted.

In addition, according to the above-described configuration, the height of the hollow portion V in the radial direction increases toward the leading edge 52 side and the trailing edge 53 side. As a result, the load can be sufficiently resisted on the leading edge 52 side and the trailing edge 53 side, and the weight of the rotor blade 50 can be reduced because the thickness of the thick portion is decreased.

Other Embodiments

An embodiment of the present disclosure has been described above in detail with reference to the drawings, but the specific configurations are not limited to this embodiment, and design changes and the like that do not depart from the scope of the present disclosure are also included.

Hereinafter, various examples in which a cooling structure (cooling portion 90) is applied to the rotor blade 50 described in the embodiment above will be described as first to sixth modified examples with reference to FIGS. 7 to 12.

First Modified Example

Figure 7:
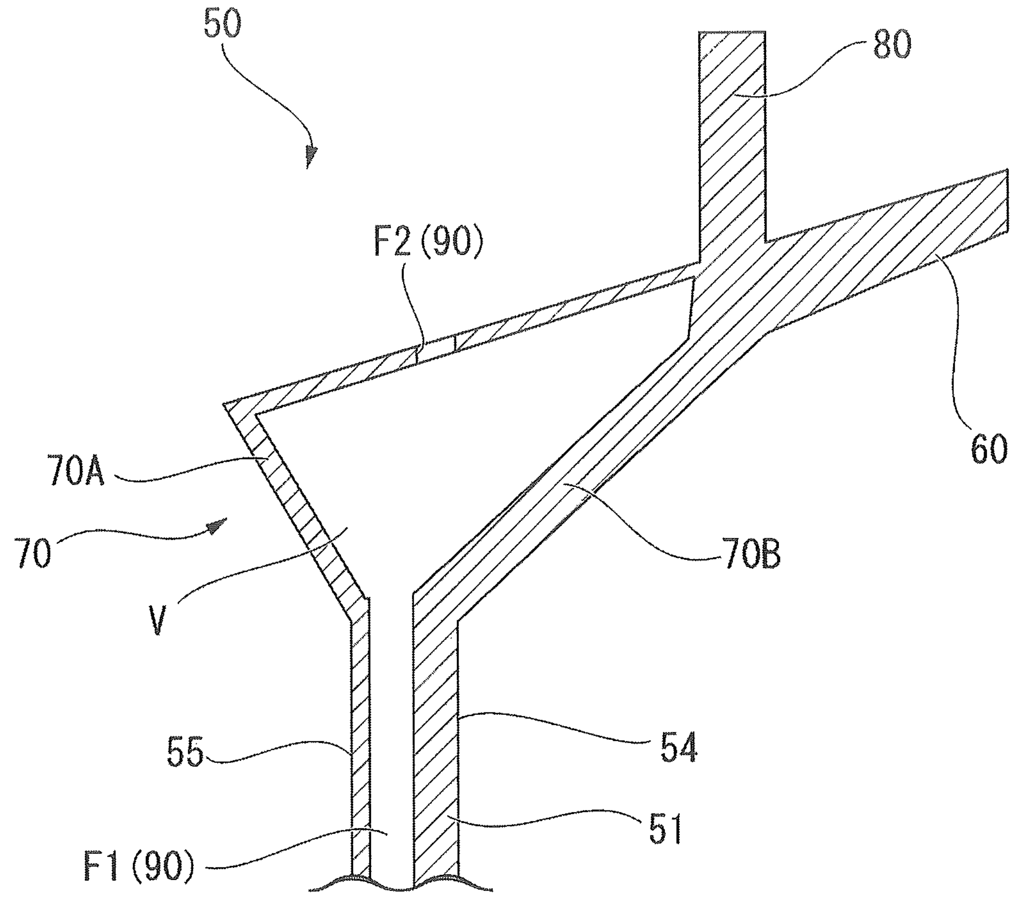
FIG. 7 is a cross-sectional view illustrating a first modified example of a rotor blade according to an embodiment of the present disclosure.

As illustrated in FIG. 7, in the present modified example, the cooling portion 90 includes a first flow path F1 that passes through the blade body 51 in the radial direction and communicates with the hollow portion V, and a second flow path F2 that communicates from the hollow portion V to the outer circumferential surface side of the shroud 60. The cooling medium (as an example, high-pressure air extracted from the compressor is used as a cooling medium) that flows into the hollow portion V through the first flow path F1 is temporarily retained in the hollow portion V, and then flows out through the second flow path F2. Each portion of the rotor blade 50 is cooled on the way.

Second Modified Example

Figure 8:
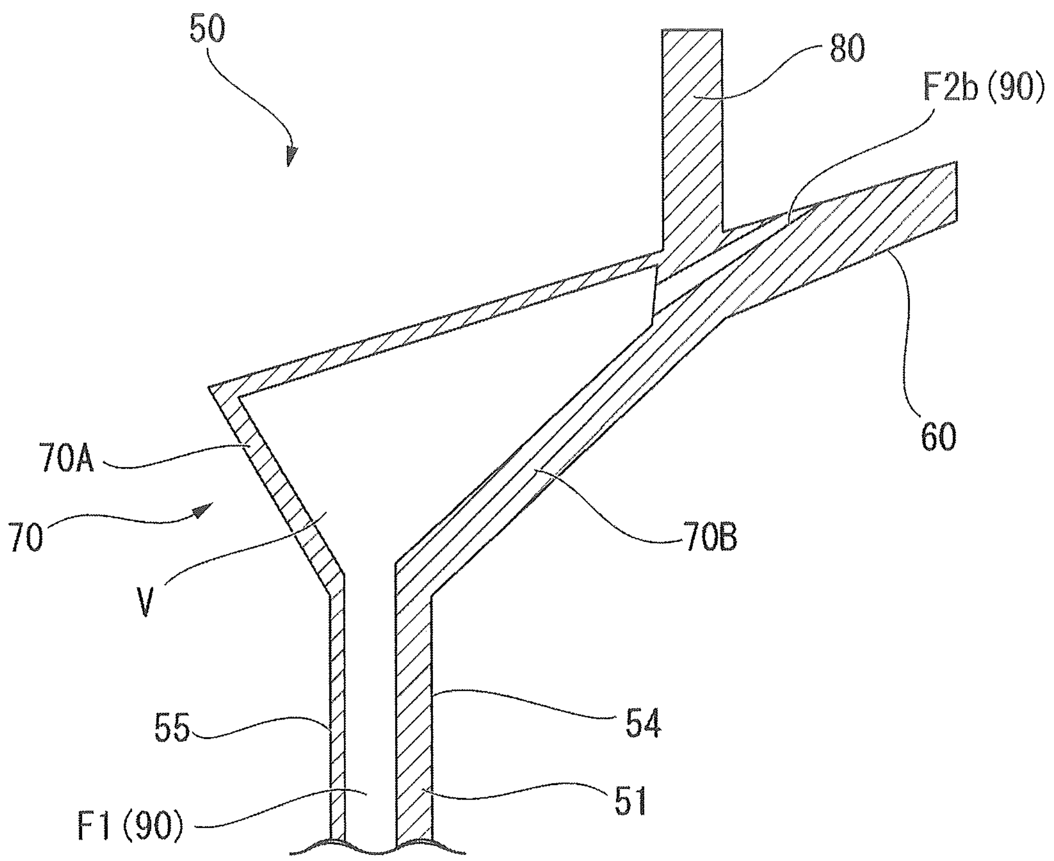
FIG. 8 is a cross-sectional view illustrating a second modified example of a rotor blade according to an embodiment of the present disclosure.

As illustrated in FIG. 8, in the second modified example, the position of a second flow path F2*b* is different from that in the first modified example described above. In the present modified example, the second flow path F2*b* starts from the hollow portion V, passes below the seal fin 80, and opens closer to the suction side 54 relative to the seal fin 80. According to such a configuration, each portion of the rotor blade 50 can be cooled, and particularly the seal fin 80 can be efficiently cooled from below.

Third Modified Example

Figure 9:
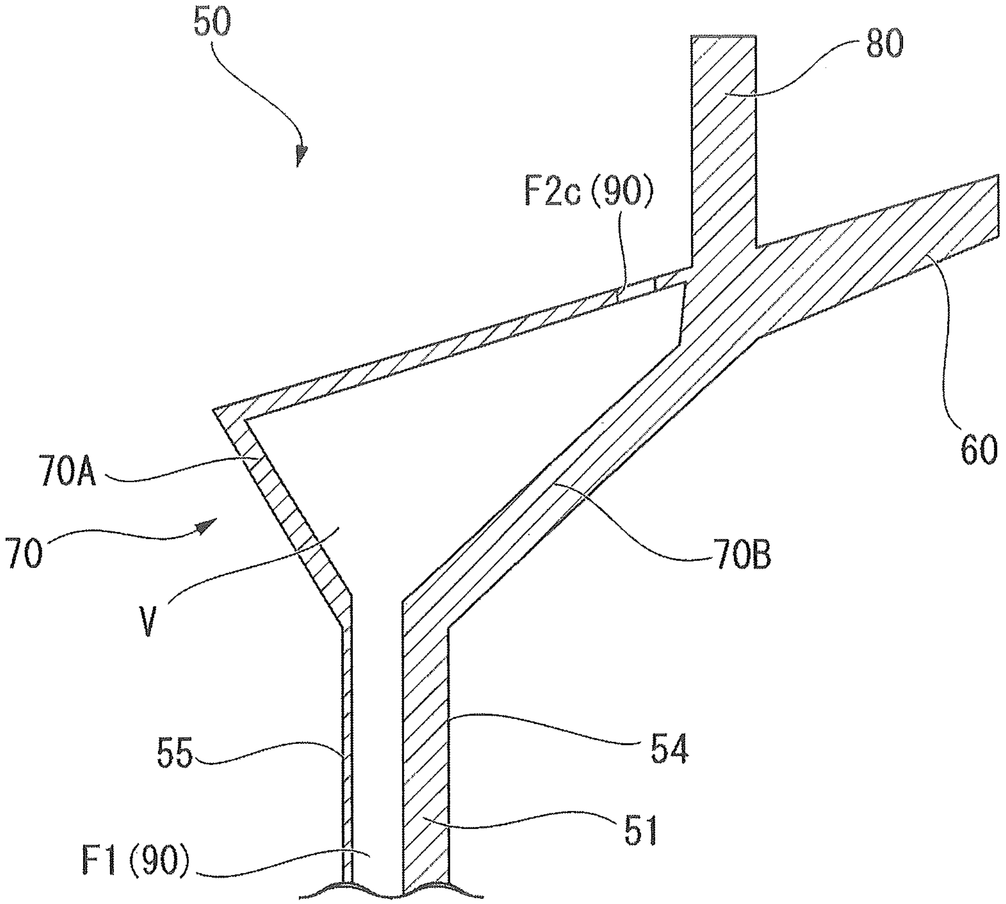
FIG. 9 is a cross-sectional view illustrating a third modified example of a rotor blade according to an embodiment of the present disclosure.

As illustrated in FIG. 9, in the third modified example, a second flow path F2*c* opens in the vicinity of the seal fin 80 and at a position on the pressure side 55. According to such a configuration, the cooling medium can be blown directly toward the seal fin 80 to obtain higher cooling effect.

Fourth Modified Example

Figure 10:
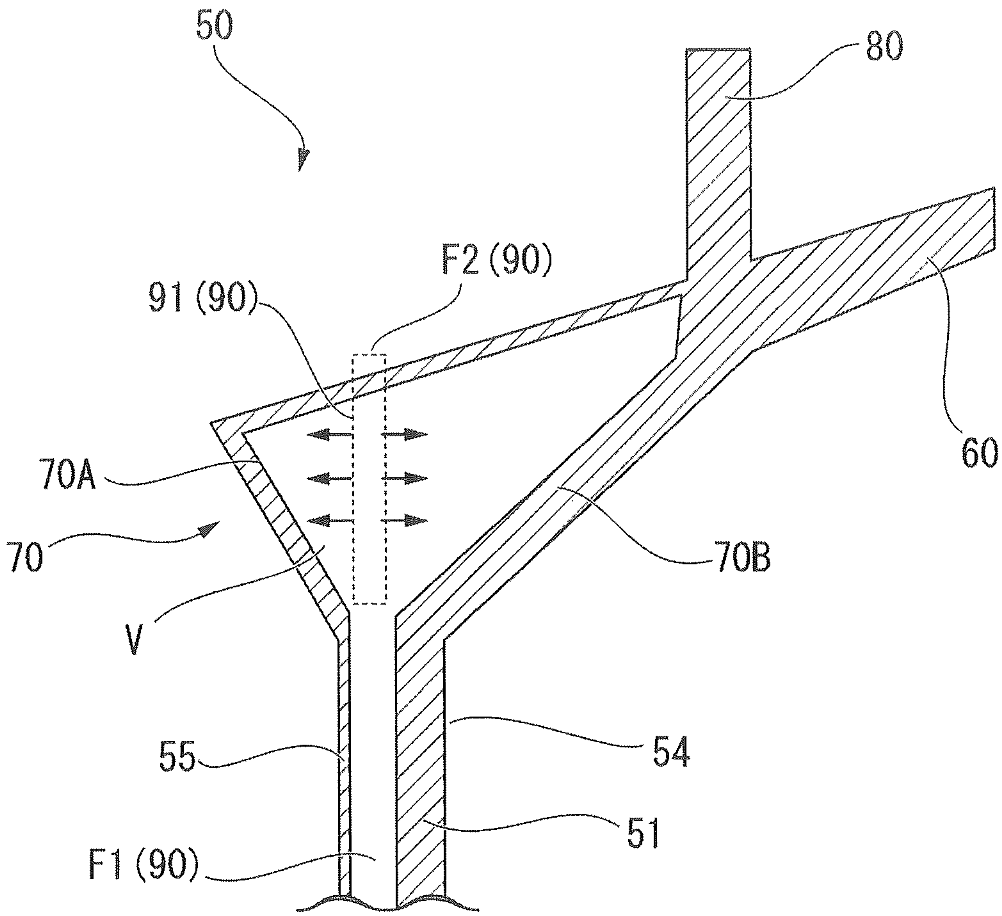
FIG. 10 is a cross-sectional view illustrating a fourth modified example of a rotor blade according to an embodiment of the present disclosure.

As illustrated in FIG. 10, in the fourth modified example, a porous tube 91 is provided at the outlet of the first flow path F1. This porous tube 91 is formed, for example, by bending metal mesh into a cylindrical shape. The porous tube 91 projects to the outer circumferential surface of the shroud 60. This projecting portion is referred to as the second flow path F2. According to such a configuration, the cooling medium flowing out from the porous tube 91 into the hollow portion V uniformly spreads out, so each portion of the rotor blade 50 can be more efficiently cooled.

Fifth Modified Example

Figure 11:
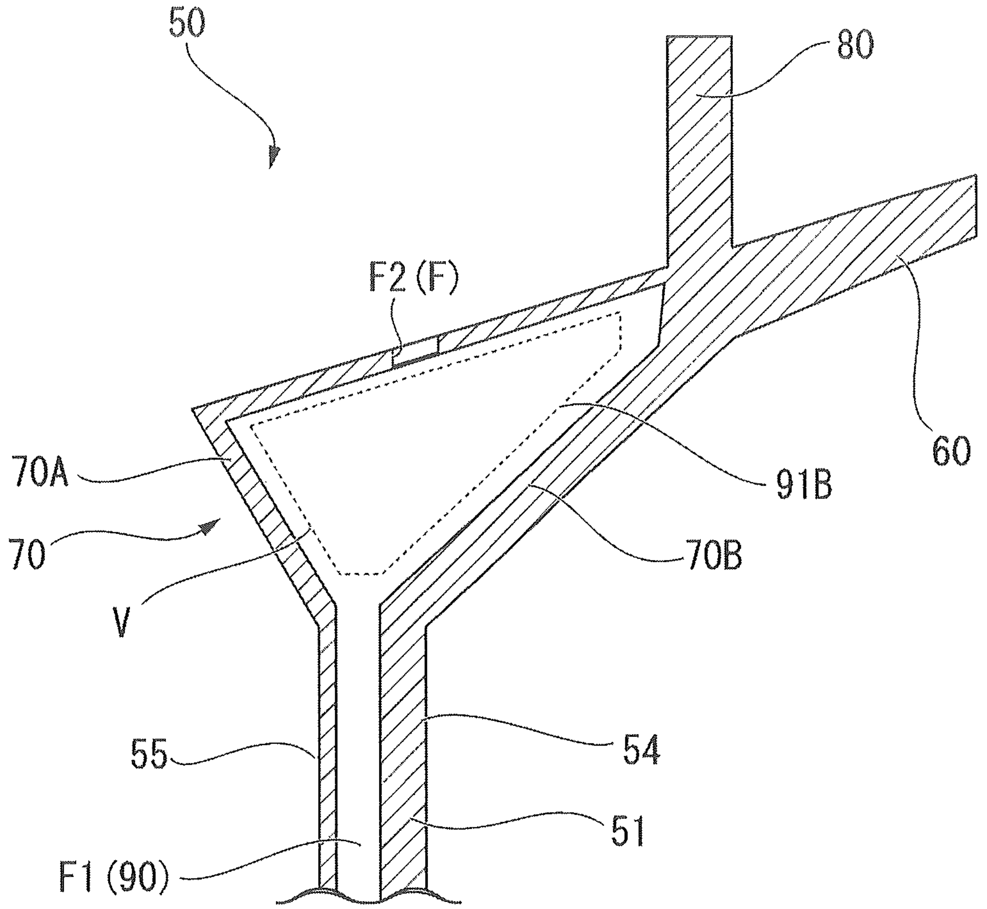
FIG. 11 is a cross-sectional view illustrating a fifth modified example of a rotor blade according to an embodiment of the present disclosure.

As illustrated in FIG. 11, in the fifth modified example, a porous plate 91*b* is disposed in place of the porous tube 91 of the fourth modified example described above. The porous plate 91*b* is preferably shaped so as to conform to the internal shape of the hollow portion V. According to such a configuration, the density and quantity of holes in the porous plate 91*b* can be varied at each site to selectively supply the cooling medium to portions where cooling is particularly desired.

Sixth Modified Example

Figure 12:
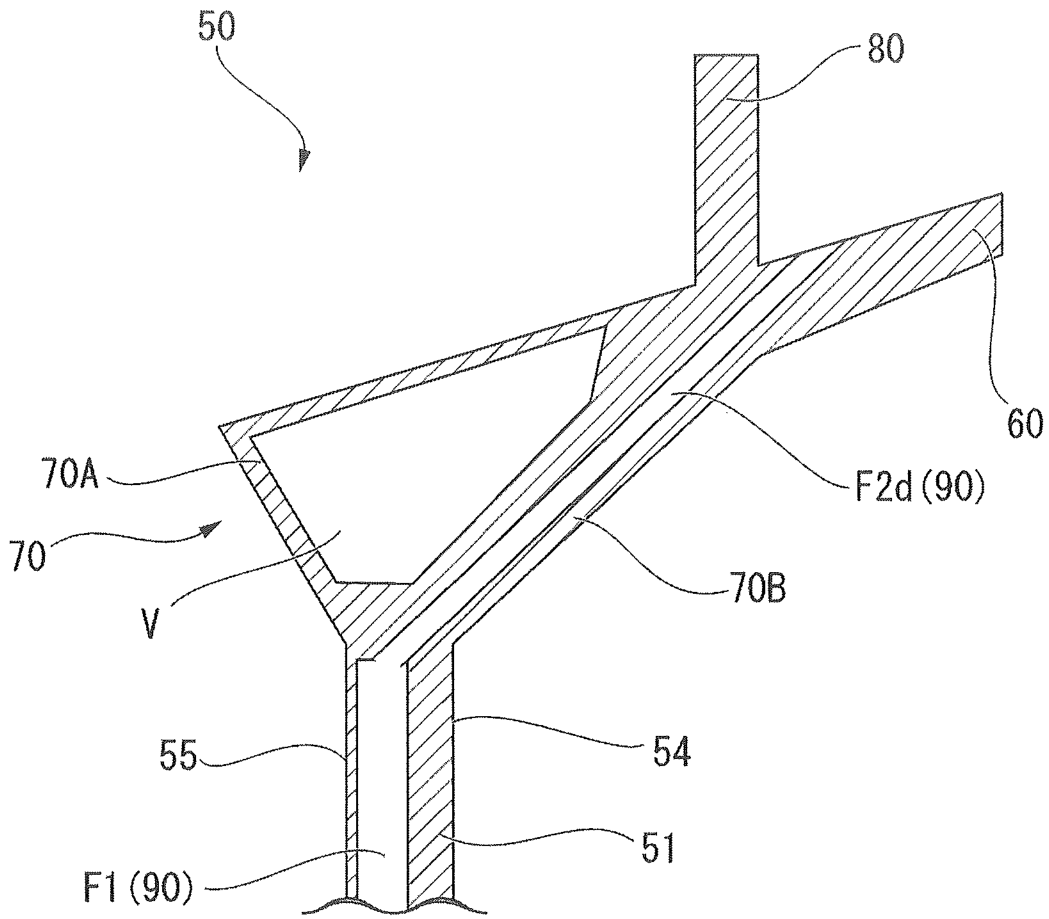
FIG. 12 is a cross-sectional view illustrating a sixth modified example of a rotor blade according to an embodiment of the present disclosure.

As illustrated in FIG. 12, in the sixth modified example, a second flow path F2*d* extends from the first flow path F1 to the outer circumferential surface of the shroud 60 while bypassing the hollow portion V. In other words, the first flow path F1 and the second flow path F2*d* are not in communication with the inside of the hollow portion V, but pass by the vicinity of the hollow portion V. According to such a configuration, the cooling medium can be more smoothly distributed without being retained in the hollow portion V. As a result, the rotor blade can be more smoothly cooled while removing the heat remaining in the hollow portion V.

Seventh Modified Example

Figure 13:
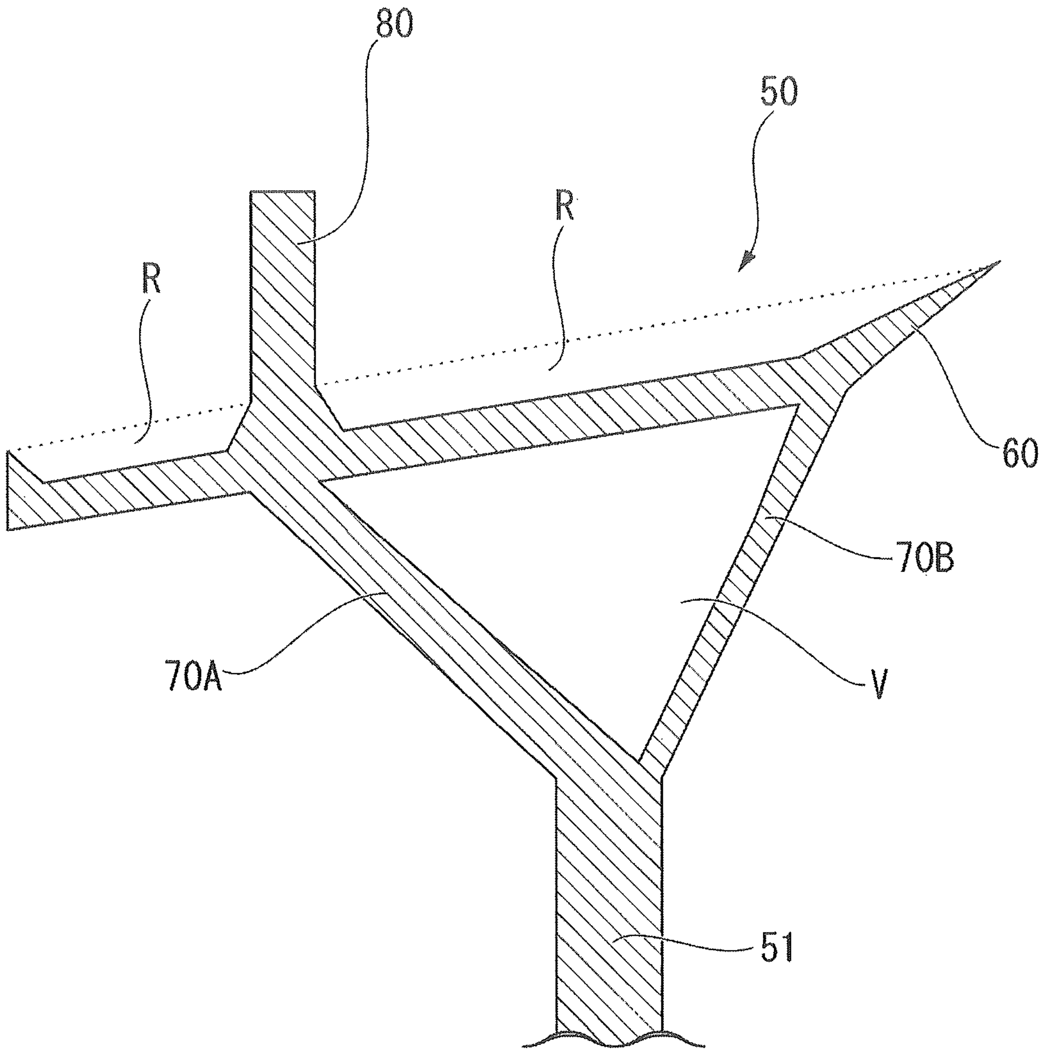
FIG. 13 is a cross-sectional view illustrating a seventh modified example of a rotor blade according to an embodiment of the present disclosure.

In addition to each of the modified examples described above related to a cooling structure, a configuration such as that illustrated in FIG. 13 can be adopted for the purpose of further weight reduction. As illustrated in the drawing, in the present modified example, a plurality of recessed portions R recessed toward the fillet portion 70 are formed in the shroud 60 so as to avoid the hollow portion V. In other words, the shroud 60 is reduced to a minimum wall thickness and volume to the extent where the necessary volume can be secured for the hollow portion V. As a result, the weight can be further reduced while ensuring the strength of the rotor blade 50.

Notes

The rotor blades according to each of the embodiments can be understood as follows, for example.

(1) A rotor blade 50 according to a first aspect is a rotor blade 50 to be attached to a rotor shaft 22 rotatable about an axis Ar, the rotor blade 50 including: a blade body 51 extending in a radial direction with respect to the axis Ar and having a blade-shaped cross-section orthogonal to the radial direction; a fillet portion 70 provided on a radial outer side of the blade body 51 and having a hollow portion V formed therein; a shroud 60 provided on a radial outer side of the fillet portion 70 and extending in a circumferential direction; and a seal fin 80 projecting from the shroud 60 to an outer circumferential side and extending in a direction intersecting the blade body 51 when viewed from the radial direction, in which a wall thickness on a suction side 54 of the fillet portion 70 is greater than a wall thickness on a pressure side 55 of the fillet portion 70 on a leading edge side of the blade body 51 as demarcated by an intersection portion Cr between the blade body 51 and the seal fin 80 serving as a boundary.

During operation of the turbine 40, a load is applied to the shroud 60 by centrifugal force such that the shroud 60 is lifted up radially outward with the blade body 51 serving as a fulcrum. Bending moment is also generated as the shroud 60 is lifted up. Additional loads are applied to the shroud 60 due to this bending moment. In particular, a large tensile load is generated on the suction side 54 of the blade body 51 on the leading edge side as demarcated by the intersection portion Cr between the seal fin 80 and the blade body 51 serving as a boundary. Here, according to the above-described configuration, the wall thickness on the suction side 54 of the fillet portion 70 is greater than the wall thickness on the pressure side 55 of the fillet portion 70 on the leading edge side of the blade body 51 as demarcated by the intersection portion Cr between the blade body 51 and the seal fin 80 serving as a boundary. In other words, the wall thickness is greater on the suction side 54 on which the tensile load described above is applied than on the pressure side 55. As a result, the tensile load can be resisted sufficiently. Furthermore, the wall thickness on the pressure 55 side having a small tensile load can be kept relatively small to reduce the weight of the rotor blade 50.

(2) In the rotor blade 50 according to a second aspect, the wall thickness on the pressure side 55 of the fillet portion 70 is greater than the wall thickness on the suction side 54 of the fillet portion 70 on the trailing edge side of the blade body 51 as demarcated by the intersection portion Cr between the blade body 51 and the seal fin 80 serving as a boundary.

During operation of the turbine 40, a large tensile load is generated on the pressure side 55 of the blade body 51 on the trailing edge side as demarcated by the intersection portion Cr between the seal fin 80 and the blade body 51 serving as a boundary. Here, according to the above-described configuration, the wall thickness on the pressure side 55 of the fillet portion 70 is greater than the wall thickness on the suction side 54 of the fillet portion 70 on the trailing edge side of the blade body 51 as demarcated by the intersection portion Cr between the blade body 51 and the seal fin 80 serving as a boundary. In other words, the wall thickness is greater on the pressure side 55 on which the tensile load described above is applied than on the suction side 54. As a result, the tensile load can be resisted sufficiently. Furthermore, the wall thickness on the suction side 54 having a small tensile load can be kept relatively small to reduce the weight of the rotor blade 50.

(3) A rotor blade 50 according to a third aspect is a rotor blade 50 to be attached to a rotor shaft 22 rotatable about an axis Ar, the rotor blade 50 including: a blade body 51 extending in a radial direction with respect to the axis Ar and having a blade-shaped cross-section orthogonal to the radial direction; a fillet portion 70 provided on a radial outer side of the blade body 51 and having a hollow portion V formed therein; a shroud 60 provided on a radial outer side of the fillet portion 70 and extending in a circumferential direction; and a seal fin 80 projecting from the shroud 60 to an outer circumferential side and extending in a direction intersecting the blade body 51 when viewed from the radial direction, in which a wall thickness on a pressure side 55 of the fillet portion 70 is greater than a wall thickness on a suction side 54 of the fillet portion 70 on a trailing edge side of the blade body 51 as demarcated by an intersection portion Cr between the blade body 51 and the seal fin 80 serving as a boundary.

During operation of the turbine 40, a large tensile load is generated on the pressure side 55 of the blade body 51 on the trailing edge side as demarcated by the intersection portion Cr between the seal fin 80 and the blade body 51 serving as a boundary. Here, according to the above-described configuration, the wall thickness on the pressure side 55 of the fillet portion 70 is greater than the wall thickness on the suction side 54 of the fillet portion 70 on the trailing edge side of the blade body 51 as demarcated by the intersection portion Cr between the blade body 51 and the seal fin 80 serving as a boundary. In other words, the wall thickness is greater on the pressure side 55 on which the tensile load described above is applied than on the suction side 54. As a result, the tensile load can be resisted sufficiently. Furthermore, the wall thickness on the suction side 54 having a small tensile load can be kept relatively small to reduce the weight of the rotor blade 50.

(4) In the rotor blade 50 according to the fourth aspect, the wall thickness on the pressure side 55 of the fillet portion 70 and the wall thickness on the suction side 54 of the fillet portion 70 are identical at the intersection portion Cr between the blade body 51 and the seal fin 80.

In the intersection portion Cr between the blade body 51 and the seal fin 80, a load is applied evenly on the pressure side 55 and the suction side 54. According to the above-described configuration, the wall thickness of the fillet portion 70 on the pressure side 55 and that on the suction side 54 are identical, so these loads can be stably resisted.

(5) A rotor blade 50 according to a fifth aspect is a rotor blade 50 to be attached to a rotor shaft 22 rotatable about an axis Ar, the rotor blade 50 including: a blade body 51 extending in a radial direction with respect to the axis Ar and having a blade-shaped cross-section orthogonal to the radial direction; a fillet portion 70 provided on a radial outer side of the blade body 51 and having a hollow portion V formed therein; a shroud 60 provided on a radial outer side of the fillet portion 70 and extending in a circumferential direction; and a seal fin 80 projecting from the shroud 60 to an outer circumferential side and extending in a direction intersecting the blade body 51 when viewed from the radial direction, in which a height of the hollow portion V in the radial direction is at a minimum at an intersection portion Cr between the blade body 51 and the seal fin 80, and is greater than the height at the intersection portion Cr at at least a part of a leading edge side and a trailing edge side.

During operation of the turbine 40, a load is applied to the shroud 60 by centrifugal force such that the shroud 60 is lifted up radially outward with the blade body 51 serving as a fulcrum. In particular, an increasingly large load is applied toward the leading edge side and the trailing edge side as demarcated by the intersection portion Cr between the seal fin 80 and the blade body 51 serving as a boundary. Here, according to the above-described configuration, the height of the hollow portion V in the radial direction at at least a part of the leading edge side and the trailing edge side is greater than the height at the intersection portion Cr. As a result, the load can be sufficiently resisted on the leading edge side and the trailing edge side, and the weight of the rotor blade 50 can be reduced because the thickness of the thick portion is decreased.

(6) A rotor blade 50 according to a sixth aspect is a rotor blade 50 to be attached to a rotor shaft 22 rotatable about an axis Ar, the rotor blade 50 including: a blade body 51 extending in a radial direction with respect to the axis Ar and having a blade-shaped cross-section orthogonal to the radial direction; a fillet portion 70 provided on a radial outer side of the blade body 51 and having a hollow portion V formed therein; a shroud 60 provided on a radial outer side of the fillet portion 70 and extending in a circumferential direction; and a seal fin 80 projecting from the shroud 60 to an outer circumferential side and extending in a direction intersecting the blade body 51 when viewed from the radial direction, in which a wall thickness on a suction side 54 of the fillet portion 70 is greater than a wall thickness on a pressure side 55 of the fillet portion 70 on a leading edge side of the blade body 51 as demarcated by an intersection portion Cr between the blade body 51 and the seal fin 80 serving as a boundary, and a height of the hollow portion V in the radial direction is at a minimum at the intersection portion Cr between the blade body 51 and the seal fin 80, and is greater than the height at the intersection portion Cr at at least a part of the leading edge side and a trailing edge side.

During operation of the turbine 40, a load is applied to the shroud 60 by centrifugal force such that the shroud 60 is lifted up radially outward with the blade body 51 serving as a fulcrum. In particular, a large tensile load is generated on the suction side 54 of the blade body 51 on the leading edge side as demarcated by the intersection portion Cr between the seal fin 80 and the blade body 51 serving as a boundary. Here, according to the above-described configuration, the wall thickness on the suction side 54 of the fillet portion 70 is greater than the wall thickness on the pressure side 55 of the fillet portion 70 on the leading edge side of the blade body 51 as demarcated by the intersection portion Cr between the blade body 51 and the seal fin 80 serving as a boundary. In other words, the wall thickness is greater on the suction side 54 on which the tensile load described above is applied than on the pressure side 55. As a result, the tensile load can be resisted sufficiently. Furthermore, the wall thickness on the pressure side 55 having a small tensile load can be kept relatively small to reduce the weight of the rotor blade 50. In addition, according to the above-described configuration, the height of the hollow portion V in the radial direction at at least a part of the leading edge side and the trailing edge side is greater than the height at the intersection portion Cr. As a result, the load can be sufficiently resisted on the leading edge side and the trailing edge side, and the weight of the rotor blade 50 can be further reduced as the thickness of the thick portion is decreased.

(7) A rotor blade 50 according to a seventh aspect is a rotor blade 50 to be attached to a rotor shaft 22 rotatable about an axis Ar, the rotor blade 50 including: a blade body 51 extending in a radial direction with respect to the axis Ar and having a blade-shaped cross-section orthogonal to the radial direction; a fillet portion 70 provided on a radial outer side of the blade body 51 and having a hollow portion V formed therein; a shroud 60 provided on a radial outer side of the fillet portion 70 and extending in a circumferential direction; and a seal fin 80 projecting from the shroud 60 to an outer circumferential side and extending in a direction intersecting the blade body 51 when viewed from the radial direction, in which a wall thickness on a pressure side 55 of the fillet portion 70 is greater than a wall thickness on a suction side 54 of the fillet portion 70 on a trailing edge side of the blade body 51 as demarcated by an intersection portion Cr between the blade body 51 and the seal fin 80 serving as a boundary, and a height of the hollow portion V in the radial direction is at a minimum at the intersection portion Cr between the blade body 51 and the seal fin 80, and is greater than the height at the intersection portion Cr at at least a part of a leading edge side and the trailing edge side.

During operation of the turbine 40, a load is applied to the shroud 60 by centrifugal force such that the shroud 60 is lifted up radially outward with the blade body 51 serving as a fulcrum. In particular, an increasingly large load is applied toward the leading edge side and the trailing edge side as demarcated by the intersection portion Cr between the seal fin 80 and the blade body 51 serving as a boundary. Here, according to the above-described configuration, the height of the hollow portion V in the radial direction at at least a part of the leading edge side and the trailing edge side is greater than the height at the intersection portion Cr. As a result, the load can be sufficiently resisted on the leading edge side and the trailing edge side, and the weight of the rotor blade 50 can be reduced because the thickness of the thick portion is decreased. Furthermore, during operation of the turbine 40, a large tensile load is generated on the pressure side 55 of the blade body 51 on the trailing edge side as demarcated by the intersection portion Cr between the seal fin 80 and the blade body 51 serving as a boundary. Here, according to the above-described configuration, the wall thickness on the pressure side 55 of the fillet portion 70 is greater than the wall thickness on the suction side 54 of the fillet portion 70 on the trailing edge side of the blade body 51 as demarcated by the intersection portion Cr between the blade body 51 and the seal fin 80 serving as a boundary. In other words, the wall thickness is greater on the pressure side 55 on which the tensile load described above is applied than on the suction side 54. As a result, the tensile load can be resisted sufficiently. Furthermore, the wall thickness on the suction side 54 having a small tensile load can be kept relatively small to reduce the weight of the rotor blade 50.

(8) A rotor blade 50 according to an eighth aspect further includes a cooling portion 90, the cooling portion 90 including: a first flow path F1 that passes through the blade body 51 in the radial direction and communicates with the hollow portion V; and a second flow path F2 that communicates from the hollow portion V to an outer circumferential surface of the shroud 60.

According to the above-described configuration, the cooling medium flowing into the hollow portion V through the first flow path F1 is temporarily retained in the hollow portion V, thereby efficiently cooling the rotor blade 50. Furthermore, the cooling medium used for cooling flows out from the hollow portion V to the outer circumferential surface of the shroud 60 by passing through the second flow path F2. As a result, the entire inside of the rotor blade 50 can be continuously cooled efficiently and smoothly.

(9) A rotor blade 50 according to a ninth aspect further includes a cooling portion 90, the cooling portion 90 including: a first flow path F1 that passes through the blade body 51 in the radial direction; and a second flow path F2*d* that communicates from the first flow path F1 to an outer circumferential surface of the shroud 60 while bypassing the hollow portion V.

According to the above-described configuration, the cooling medium flowing from the first flow path F1 into the second flow path F2*d* bypasses the hollow portion V and flows out to the outer circumferential surface of the shroud 60. In other words, the cooling medium does not flow into the hollow portion V, but passes by the vicinity of the hollow portion V. As a result, the rotor blade 50 can be more smoothly cooled while removing the heat remaining in the hollow portion V.

(10) In the rotor blade 50 according to a tenth aspect, a recessed portion R recessed toward a fillet portion 70 side is formed in the shroud 60 so as to avoid the hollow portion V.

According to the above-described configuration, because the recessed portion R is formed in the shroud 60 so as to avoid the hollow portion V, the weight of the rotor blade 50 can be further reduced.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A rotor blade to be attached to a rotor shaft rotatable about an axis, the rotor blade comprising:

a blade body extending in a radial direction with respect to the axis and having a blade-shaped cross-section orthogonal to the radial direction;

a fillet portion provided on a radial outer side of the blade body and having a hollow portion formed therein;

a shroud provided on a radial outer side of the fillet portion and extending in a circumferential direction; and a seal fin projecting from the shroud to an outer circumferential side and extending in a direction intersecting the blade body when viewed from the radial direction, wherein a wall thickness on a suction side of the fillet portion is greater than a wall thickness on a pressure side of the fillet portion on a leading edge side of the blade body as demarcated by an intersection portion between the blade body and the seal fin serving as a boundary, and wherein the wall thickness on the pressure side of the fillet portion and the wall thickness on the suction side of the fillet portion are substantially identical at the intersection portion between the blade body and the seal fin.

2. The rotor blade according to claim 1, wherein the wall thickness on the pressure side of the fillet portion is greater than the wall thickness on the suction side of the fillet portion on a trailing edge side of the blade body as demarcated by the intersection portion between the blade body and the seal fin serving as a boundary.

3. The rotor blade according to claim 2, wherein the wall thickness on the pressure side of the fillet portion and the wall thickness on the suction side of the fillet portion are substantially identical at the intersection portion between the blade body and the seal fin.

4. The rotor blade according to claim 1, further comprising a cooling portion, the cooling portion including:

a first flow path that passes through the blade body in the radial direction and communicates with the hollow portion; and a second flow path that communicates from the hollow portion to an outer circumferential surface of the shroud.

5. The rotor blade according to claim 1, further comprising a cooling portion, the cooling portion including:

a first flow path that passes through the blade body in the radial direction; and a second flow path that communicates from the first flow path to an outer circumferential surface of the shroud while bypassing the hollow portion.

6. The rotor blade according to claim 1, wherein a recessed portion recessed toward a fillet portion side is formed in the shroud so as to avoid the hollow portion.

7. A rotor blade to be attached to a rotor shaft rotatable about an axis, the rotor blade comprising:

a blade body extending in a radial direction with respect to the axis and having a blade-shaped cross-section orthogonal to the radial direction;

a fillet portion provided on a radial outer side of the blade body and having a hollow portion formed therein;

a shroud provided on a radial outer side of the fillet portion and extending in a circumferential direction; and a seal fin projecting from the shroud to an outer circumferential side and extending in a direction intersecting the blade body when viewed from the radial direction, wherein a wall thickness on a pressure side of the fillet portion is greater than a wall thickness on a suction side of the fillet portion on a trailing edge side of the blade body as demarcated by an intersection portion between the blade body and the seal fin serving as a boundary, and wherein the wall thickness on the pressure side of the fillet portion and the wall thickness on the suction side of the fillet portion are substantially identical at the intersection portion between the blade body and the seal fin.

8. A rotor blade to be attached to a rotor shaft rotatable about an axis, the rotor blade comprising:

a blade body extending in a radial direction with respect to the axis and having a blade-shaped cross-section orthogonal to the radial direction;

a fillet portion provided on a radial outer side of the blade body and having a hollow portion formed therein;

a shroud provided on a radial outer side of the fillet portion and extending in a circumferential direction; and a seal fin projecting from the shroud to an outer circumferential side and extending in a direction intersecting the blade body when viewed from the radial direction, wherein a height of the hollow portion in the radial direction is at a minimum at an intersection portion between the blade body and the seal fin, and is greater than the height at the intersection portion at at least a part of a leading edge side and a trailing edge side.

9. A rotor blade to be attached to a rotor shaft rotatable about an axis, the rotor blade comprising:

a blade body extending in a radial direction with respect to the axis and having a blade-shaped cross-section orthogonal to the radial direction;

a fillet portion provided on a radial outer side of the blade body and having a hollow portion formed therein;

a shroud provided on a radial outer side of the fillet portion and extending in a circumferential direction; and a seal fin projecting from the shroud to an outer circumferential side and extending in a direction intersecting the blade body when viewed from the radial direction, wherein a wall thickness on a suction side of the fillet portion is greater than a wall thickness on a pressure side of the fillet portion on a leading edge side of the blade body as demarcated by an intersection portion between the blade body and the seal fin serving as a boundary, and a height of the hollow portion in the radial direction is at a minimum at the intersection portion between the blade body and the seal fin, and is greater than the height at the intersection portion at at least a part of the leading edge side and a trailing edge side.

10. A rotor blade to be attached to a rotor shaft rotatable about an axis, the rotor blade comprising:

a blade body extending in a radial direction with respect to the axis and having a blade-shaped cross-section orthogonal to the radial direction;

a fillet portion provided on a radial outer side of the blade body and having a hollow portion formed therein;

a shroud provided on a radial outer side of the fillet portion and extending in a circumferential direction; and a seal fin projecting from the shroud to an outer circumferential side and extending in a direction intersecting the blade body when viewed from the radial direction, wherein a wall thickness on a pressure side of the fillet portion is greater than a wall thickness on a suction side of the fillet portion on a trailing edge side of the blade body as demarcated by an intersection portion between the blade body and the seal fin serving as a boundary, and a height of the hollow portion in the radial direction is at a minimum at the intersection portion between the blade body and the seal fin, and is greater than the height at the intersection portion at at least a part of a leading edge side and the trailing edge side.

* * * * *